(12) United States Patent
Jeong et al.

(10) Patent No.: US 12,486,215 B2
(45) Date of Patent: Dec. 2, 2025

(54) METHOD OF MANUFACTURING DIESTER-BASED COMPOUND

(71) Applicant: LG CHEM, LTD., Seoul (KR)

(72) Inventors: Jae Hun Jeong, Daejeon (KR); Sung Kyu Lee, Daejeon (KR); Yeon Uk Choo, Daejeon (KR); Song Hoon Lee, Daejeon (KR); Hyoung Jun, Daejeon (KR); Yun Gon Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 923 days.

(21) Appl. No.: 17/640,722

(22) PCT Filed: Aug. 20, 2021

(86) PCT No.: PCT/KR2021/011080
§ 371 (c)(1),
(2) Date: Mar. 4, 2022

(87) PCT Pub. No.: WO2022/108048
PCT Pub. Date: May 27, 2022

(65) Prior Publication Data
US 2023/0150911 A1 May 18, 2023

(30) Foreign Application Priority Data
Nov. 17, 2020 (KR) .................... 10-2020-0153990

(51) Int. Cl.
*C07C 67/08* (2006.01)
*B01J 19/18* (2006.01)
(Continued)

(52) U.S. Cl.
CPC .......... *C07C 67/08* (2013.01); *B01J 19/1856* (2013.01); *B01J 19/1862* (2013.01);
(Continued)

(58) Field of Classification Search
None
See application file for complete search history.

(56) References Cited

U.S. PATENT DOCUMENTS

| | | | | |
|---|---|---|---|---|
| 3,600,137 A | * | 8/1971 | Girantet et al. | ..... B01J 19/2425 422/201 |
| 11,104,636 B2 | * | 8/2021 | Kim | ..................... B01J 19/0046 |

(Continued)

FOREIGN PATENT DOCUMENTS

| | | |
|---|---|---|
| CN | 101591242 A | 12/2009 |
| FR | 1491074 A | 8/1967 |

(Continued)

OTHER PUBLICATIONS

International Search Report and Written Opinion issued in corresponding International Patent Application No. PCT/KR2021/011080, dated Nov. 30, 2021.

(Continued)

*Primary Examiner* — Amy C Bonaparte
(74) *Attorney, Agent, or Firm* — Morgan, Lewis & Bockius LLP

(57) ABSTRACT

The present invention relates to a method of manufacturing a diester-based compound, and, more particularly, to a method of manufacturing a diester-based compound, which is performed using a continuous process including a reaction part in which a total of n reaction units spanning from a first reaction unit to an nth reaction unit are connected in series, wherein each of the reaction units includes a reactor, and the method includes: supplying a feed stream including a dicarboxylic acid and an alcohol into the first reactor; esterifying the feed stream to prepare a reaction product; and supplying a lower discharge stream including the reaction product into the reactor of the rear reaction unit. In this case, a conversion (Continued)

rate of the esterification reaction in the first reactor is controlled in a range of 50 to 80%.

10 Claims, 3 Drawing Sheets

(51) Int. Cl.
  *B01J 19/24* (2006.01)
  *C07C 67/48* (2006.01)
  *C07C 67/54* (2006.01)
  *C07C 69/82* (2006.01)

(52) U.S. Cl.
  CPC ....... *B01J 19/2425* (2013.01); *B01J 19/2445* (2013.01); *B01J 19/245* (2013.01); *C07C 67/48* (2013.01); *C07C 67/54* (2013.01); *C07C 69/82* (2013.01); *B01J 2204/00* (2013.01); *B01J 2219/00038* (2013.01); *B01J 2219/0004* (2013.01); *B01J 2219/00051* (2013.01); *B01J 2219/00162* (2013.01); *B01J 2219/00247* (2013.01); *B01J 2219/00252* (2013.01); *B01J 2219/00353* (2013.01)

(56) References Cited

U.S. PATENT DOCUMENTS

| 11,512,166 | B2* | 11/2022 | Kim | B01J 19/245 |
| 11,840,510 | B2* | 12/2023 | Kim | C07C 67/02 |
| 12,084,413 | B2* | 9/2024 | Jeong | C07C 69/80 |
| 2007/0038001 | A1 | 2/2007 | Cook et al. | |
| 2011/0251420 | A1* | 10/2011 | Disteldorf | C07C 67/08 560/99 |
| 2013/0030221 | A1* | 1/2013 | Barton | C07C 29/149 568/831 |
| 2020/0317816 | A1* | 10/2020 | Ewert | A61K 39/39566 |

FOREIGN PATENT DOCUMENTS

| FR | 1583867 | A | 12/1969 | |
| JP | 5515424 | A | 2/1980 | |
| JP | S55-15424 | A | 2/1980 | |
| JP | S60-72845 | A | 4/1985 | |
| JP | 2012-512229 | A | 5/2012 | |
| KR | 10-2009-0115125 | A | 11/2009 | |
| KR | 10-2011-0101205 | A | 9/2011 | |
| KR | 10-2013-0042742 | A | 4/2013 | |
| KR | 10-1663586 | A | 10/2016 | |
| KR | 10-1663586 | B1 | 10/2016 | |
| KR | 10-2019-0027623 | A | 3/2019 | |
| KR | 10-2162203 | B1 | 10/2020 | |
| KR | 10-2162204 | B1 | 10/2020 | |
| NL | 2021197 | | 1/2019 | |
| WO | WO-2021231271 | A1* | 11/2021 | B01J 39/07 |

OTHER PUBLICATIONS

Extended European Search Report dated Nov. 17, 2022, issued in corresponding European Patent Application No. 21859367.1.
Extended European Search Report dated Nov. 9, 2022, issued in corresponding European Patent Application No. 21859367.1.

* cited by examiner

【Figure 1】
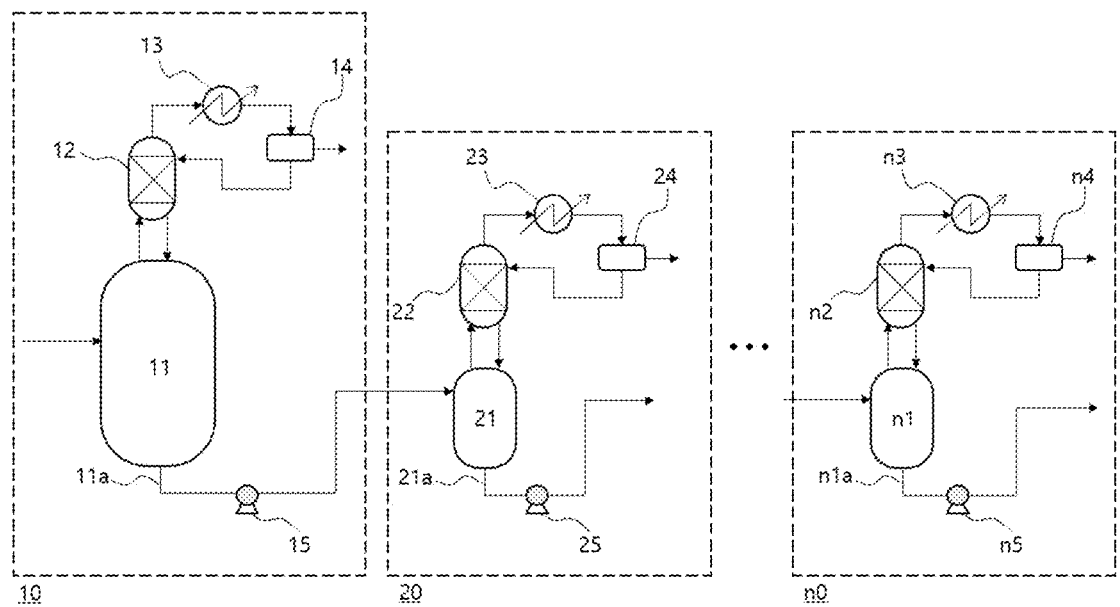
【Figure 2】
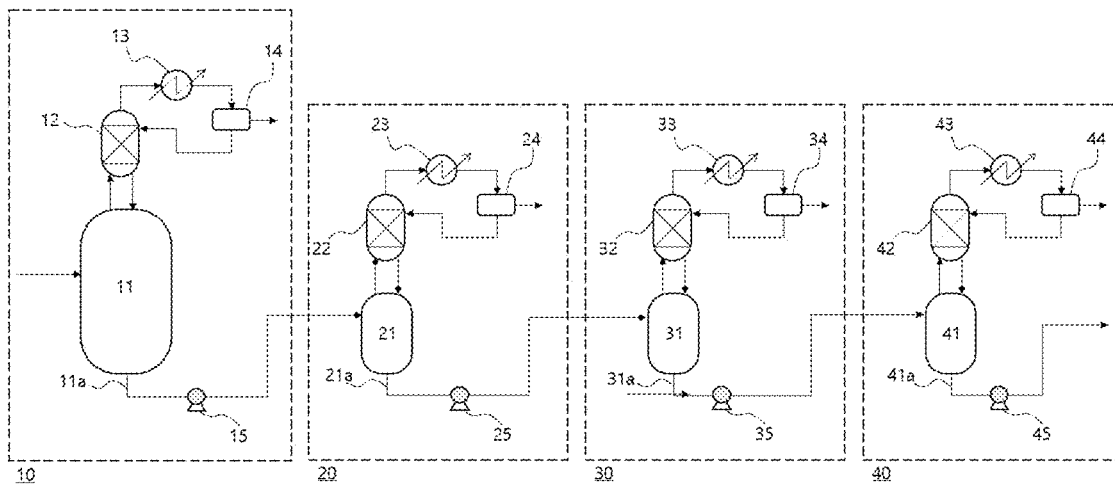

【Figure 3】
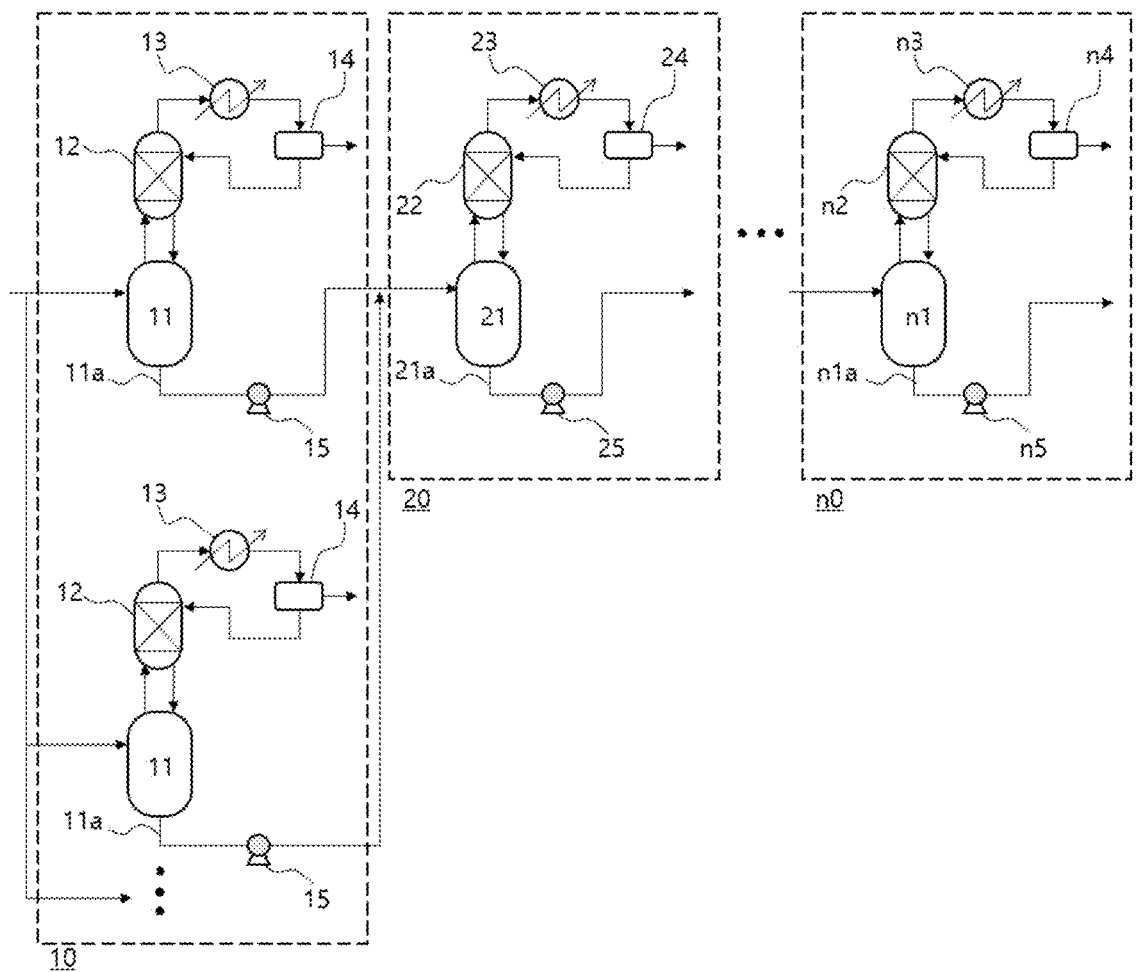

【Figure 4】
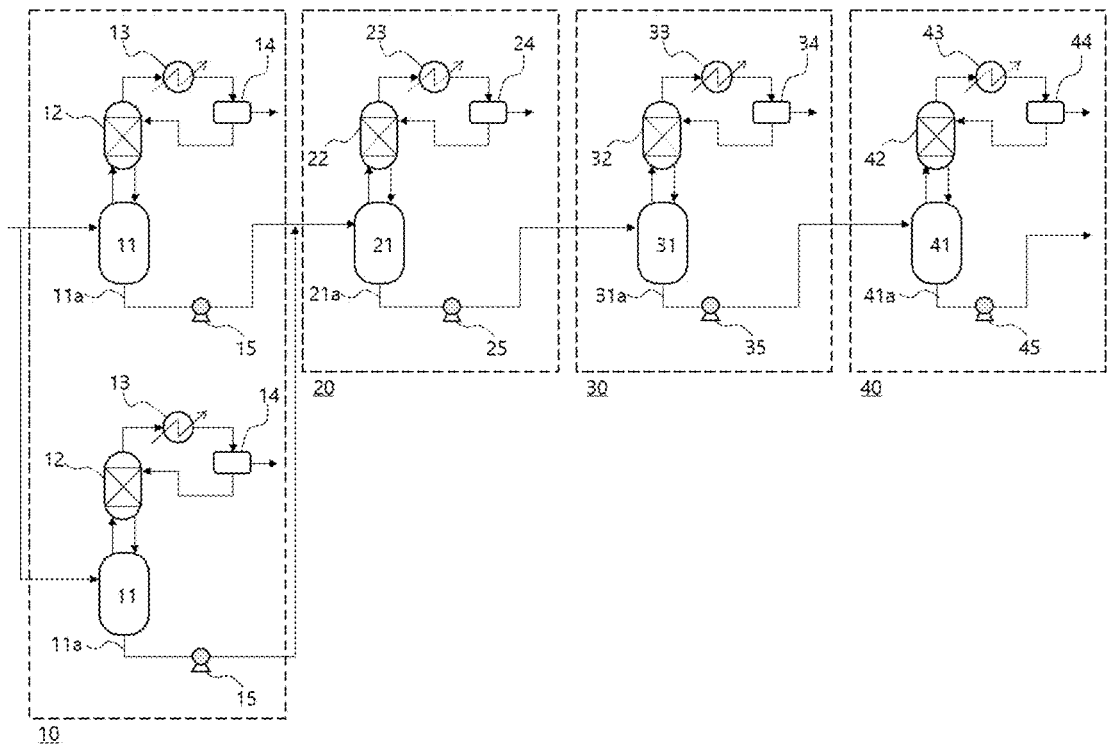
【Figure 5】
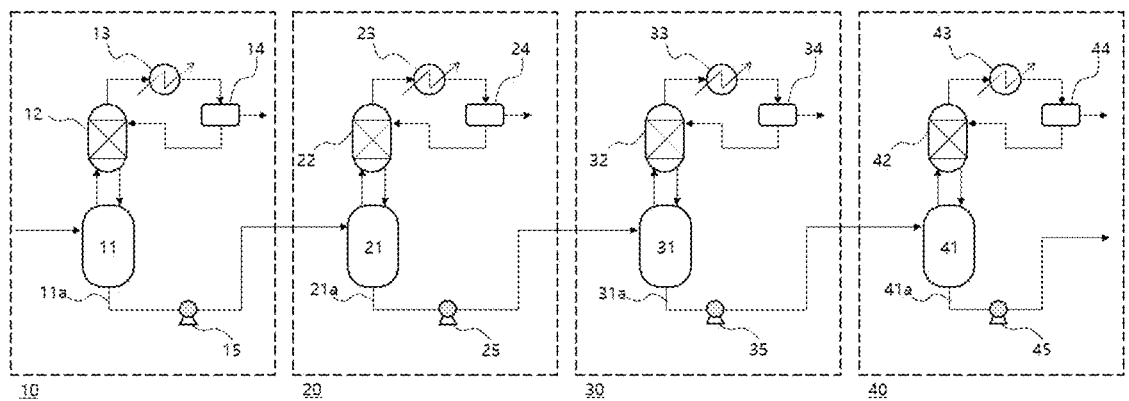

METHOD OF MANUFACTURING DIESTER-BASED COMPOUND

CROSS-REFERENCE TO RELATED APPLICATION

This application claims priority to and the benefit of Korean Patent Application No. 10-2020-0153990, filed Nov. 17, 2020, the disclosure of which is incorporated herein by reference in its entirety.

TECHNICAL FIELD

The present invention relates to a method of manufacturing a diester-based compound, and, more particularly, to a method of manufacturing a diester-based compound capable of preventing the clogging of pipes, pumps, and the like with unreacted materials since the unreacted materials are accumulated in a lower discharge stream of a reactor including a reaction product when the diester-based compound is manufactured using a continuous process.

BACKGROUND ART

Phthalate-based plasticizers account for 92% of the global plasticizer market by the 20th century, and are additives that are mainly used to impart flexibility, durability, cold hardiness, and the like to polyvinyl chloride (PVC) and reduce melt viscosity to improve processability. Therefore, the phthalate-based plasticizers may be introduced into the PVC at various contents and thus widely used for applications spanning from hard products such as hard pipes to soft and stretchable materials such as food packaging materials, blood bags, flooring materials, and the like, which are closely related to the real lives and unavoidably come into direct contact to the human body among other materials.

Despite the compatibility with PVC and the excellent softness-imparting property of the phthalate-based plasticizer, however, the phthalate-based plasticizer is leaked little by little out of PVC products containing the phthalate-based plasticizer when the PVC products are used in real life. Therefore, there have been issues regarding the harmfulness of the phthalate-based plasticizer from the fact that the phthalate-based plasticizer may serve as a suspected endocrine disruptor (an environmental hormone) and a carcinogen at a level of heavy metals. In particular, since it has been reported in the USA by the 1960s that di-(2-ethylhexyl)phthalate (DEHP) which was used at the largest amount was leaked out of the PVC products, various types of research on the harmfulness of the phthalate-based plasticizer to the human body have been conducted with an increasing interest in environmental hormones in the 1990s.

Accordingly, many groups of researchers have conducted research to develop an environmentally-friendly plasticizer capable of being replaced by the di-(2-ethylhexyl)phthalate and improve a process for the environmentally-friendly plasticizer in order to deal with the environmental regulations and the environmental hormone problems caused by the leakage of diester-based phthalate-based plasticizers (particularly, di-(2-ethylhexyl)phthalate).

Meanwhile, a batch-type process has been applied as a process of manufacturing the diester-based plasticizer in most industry fields, and a system for refluxing an unreacted material in a reactor and effectively removing side reaction products using the batch-type process has been developed. However, the manufacturing of the diester-based plasticizer using the batch-type process has limitations on a reflux rate or an amount of steam, has very low productivity, and also has technical limitations applicable to solve the problems.

Also, to solve the problems of the batch-type process having the above-described problems, a process in which two or more reactors are connected in series during the manufacturing of the diester-based plasticizer to constitute a reaction part has been developed. However, unlike the batch-type process in which only products are transferred after the reaction is completed, a continuous process is performed using various reactors which are connected in series or parallel. Therefore, when the reaction product is transferred to the rear reactors in the continuous process, not only the desired product but also unreacted materials are transferred in a slurry state in which the desired product is mixed with the unreacted materials. For this purpose, the reaction product has a high content of the unreacted materials in the first reactor. Therefore, because the solid unreacted materials in a slurry stream are accumulated in pipes and pumps through which the reaction product drawn off from the first reactor is transferred, the flowability may be degraded when the reaction product is transferred to the rear reactors, resulting in a shortened operation cycle due to the easy clogging of the pipes and pumps.

DISCLOSURE

Technical Problem

To solve the problems as mentioned above in the background art of the present invention, an object of the present invention is to provide a method of manufacturing a diester-based compound capable of improving flowability when a reaction product drawn off from a reactor of a first reaction unit is transferred to rear reactors and extending a maintenance/repair duration in pipes and pumps accordingly, wherein the diester-based compound is manufactured as an environmentally-friendly plasticizer using a continuous process.

Technical Solution

In one general aspect, a method of manufacturing a diester-based compound is performed using a continuous process including a reaction part in which a total of n reaction units spanning from a first reaction unit to an $n^{th}$ reaction unit are connected in series, wherein each of the reaction units includes a reactor, and the method includes: supplying a feed stream including a dicarboxylic acid and an alcohol into the first reactor; esterifying the feed stream to prepare a reaction product; and supplying a lower discharge stream including the reaction product into the reactors of the rear reaction units, wherein a conversion rate of the esterification reaction in the first reactor is controlled in a range of 50 to 80%.

Advantageous Effects

According to the present invention, when a diester-based compound is manufactured using a continuous process, a conversion rate in a reactor of a first reaction unit can be controlled to increase a linear velocity of a lower discharge stream in the reactor of the first reaction unit to a limit velocity or higher, thereby improving the flowability.

That is, pipes, pumps, and the like can be prevented from being clogged with unreacted materials included in the lower discharge stream in the reactor of the first reaction unit as the unreacted materials are accumulated in the pipes, the pumps, and the like.

DESCRIPTION OF DRAWINGS

FIGS. 1 to 4 are process flow charts of methods of manufacturing a diester-based compound according to one embodiment of the present invention, respectively.

FIG. 5 is a process flow chart of a method of manufacturing a diester-based compound according to a comparative embodiment.

BEST MODE

Prior to the description, it should be understood that the terminology used in the specification and the appended claims should not be construed as limited to general and dictionary meanings, but interpreted based on the meanings and concepts corresponding to technical aspects of the present invention on the basis of the principle that the present inventors can appropriately define the concepts of terms for the purpose of describing the present invention in the best way.

In the present invention, the term "upper" may refer to a region that corresponds to a height of 50% or more from the entire height of a device in a vessel, and the term "lower" may refer to a region that corresponds to a height of less than 50% of the entire height of the device and the vessel.

In the present invention, the term "stream" may refer to a flow of a fluid during a process, and may also refer to a fluid itself that flows in a pipe. Specifically, the "stream" may refer to both a fluid itself and a flow of the fluid that flows in a pipe connected to each device. Also, the fluid may refer to a gas or a liquid. It is not intended to exclude any case in which solid contents are included in the fluid.

In the present invention, the term "slurry" may refer to a suspension in which a mixture of a solid and a liquid, or fine solid particles are suspended in water. As a specific example, the slurry may refer to a solid- or liquid-phase reactant used in a polymerization reaction, and a mixture of solid- or liquid-phase polymers generated in the polymerization reaction.

Hereinafter, the present invention will be described in further detail with reference to FIGS. 1 to 4 in order to aid in understanding the present invention.

According to the present invention, a method of manufacturing a diester-based compound is provided. Referring to FIG. 1 below, the method of manufacturing a diester-based compound is performed using a continuous process including a reaction part in which a total of n reaction units spanning from a first reaction unit 10 to an $n^{th}$ reaction unit n0 are connected in series, wherein the respective reaction units 10, 20 and n0 include reactors 11, 21 and n1 spanning from a first reactor 11 to an $n^{th}$ reactor n1, and layer separators 14, 24 and n4 spanning from a first layer separator 14 to an $n^{th}$ layer separator n4, respectively. Here, the method of manufacturing a diester-based compound includes: supplying a feed stream including a dicarboxylic acid and an alcohol into the first reactor 11; esterifying the feed stream to manufacture a reaction product; and supplying a lower discharge stream including the reaction product into the reactors of the rear reaction units, wherein a conversion rate of the esterification reaction in the first reactor may be controlled in a range of 50 to 80%.

According to one embodiment of the present invention, the manufacturing of the diester-based compound may be performed using a continuous process including a reaction part in which a total of n reaction units 10, 20 and n0 spanning from a first reaction unit 10 to an $n^{th}$ reaction unit n0 are connected in series.

Specifically, a batch-type manufacturing process was applied to the manufacturing of the diester-based compound as known in the prior art. However, the manufacturing of the diester-based plasticizer using the batch-type process has limitations on a reflux rate or an amount of steam, has very low productivity, and also has technical limitations applicable to solve the problems.

Also, in order to solve the above-described problems of the batch-type process, a process in which two or more reactors are connected in series during the manufacturing of the diester-based compound to constitute a reaction part has been developed. However, unlike the batch-type process in which only products are transferred after the reaction is completed, a continuous process is performed using various reactors which are connected in series or parallel. Therefore, when the reaction product is transferred to the rear reactors in the continuous process, not only the desired product but also unreacted materials are transferred in a slurry state in which the desired product is mixed with the unreacted materials. For this purpose, the reaction product has a high content of the unreacted materials in the first reactor. Therefore, because the solid unreacted materials in a slurry stream are accumulated in pipes and pumps through which the reaction product drawn off from the first reactor is transferred, the flowability may be degraded when the reaction product is transferred to the rear reactors, resulting in a shortened operation cycle due to the easy clogging of the pipes and pumps.

Therefore, when the diester-based compound is manufactured using the continuous process according to the present invention, a conversion rate in the reactor of the first reaction unit may be controlled to increase a linear velocity of a lower discharge stream in the reactor of the first reaction unit to a limit velocity or higher, thereby improving the flowability. Also, the clogging of pipes, pumps, and the like of lower draw-off lines in the reactor of the first reaction unit may be prevented to extend a maintenance/repair duration in the pipes and pumps.

According to one embodiment of the present invention, the reaction unit may include a total of n reactors spanning from a first reactor to an $n^{th}$ reactor. As a specific example, each of the reactors may be a reactor used to esterify a dicarboxylic acid and an alcohol.

The esterification reaction may be a reaction in which a dicarboxylic acid and an alcohol are supplied into a reactor and are directly esterified in the presence of a catalyst. As such, a diester-based compound and water as a by-product may be generated through the esterification reaction of the dicarboxylic acid and the alcohol. The operating temperature, the operating pressure, the time, and the type and content of the catalyst, which may be used to perform the direct esterification reaction, may be applied as the conventional conditions applied as in the prior art, or may be applied after they are properly adjusted according to the process operations, when necessary.

The dicarboxylic acid and the alcohol may be mixed using a pre-mixer and introduced as a mixture in batches before the dicarboxylic acid and the alcohol are supplied into the reactor, or may be introduced in batches into the reactors provided with separate feed lines, respectively.

The dicarboxylic acid may, for example, include one or more selected from the group consisting of aromatic polyhydric carboxylic acids such as phthalic acid, isophthalic acid, terephthalic acid, trimellitic acid, and the like; and saturated or unsaturated, aliphatic polyhydric carboxylic acids such as adipic acid, sebacic acid, azelaic acid, succinic acid, maleic acid, fumaric acid, and the like. As a specific example, the dicarboxylic acid may be solid. As a more specific example, the dicarboxylic acid may be terephthalic acid.

For example, the alcohol may be a monohydric alcohol having 4 to 13, 5 to 12, or 6 to 10 carbon atoms. For example, the monohydric alcohol may include straight or branched alcohols such as n-butyl alcohol, isobutyl alcohol, secondary butyl alcohol, n-pentyl alcohol, n-hexyl alcohol, n-heptyl alcohol, n-octyl alcohol, 2-ethylhexanol, iso-octyl alcohol, iso-nonyl alcohol, n-nonyl alcohol, iso-decyl alcohol, n-decyl alcohol, undecyl alcohol, tridecyl alcohol, and the like. As a specific example, the alcohol may be 2-ethylhexanol.

An excessive amount of the alcohol may be supplied into the reactor, based on a stoichiometric amount required to react with the dicarboxylic acid. For example, in the esterification reaction, a mole ratio of the dicarboxylic acid and the alcohol may be in a range of 1:2 to 1:10, 1:2 to 1:5, or 1:2 to 1:4.5. That is, the mole ratio of the dicarboxylic acid and the alcohol in the feed stream supplied into the reactor may be in a range of 1:2 to 1:10, 1:2 to 1:5, or 1:2 to 1:4.5. When the dicarboxylic acid and the alcohol are supplied as the reactants into the reactor in the mole ratio range, a desired conversion rate may be easily reached by minimizing a use amount of steam and controlling a forward reaction rate of the esterification reaction.

For example, the catalyst may include one or more selected from the group consisting of acid catalysts such as sulfuric acid, para-toluenesulfonic acid, methanesulfonic acid, and the like; alkyl titanate catalysts such as tetraisopropyl titanate, tetrabutyl titanate, tetra-2-ethylhexyl titanate, and the like; and organic metal catalysts such as dibutyl tin oxide, butyl tin malate, and the like. As a specific example, an organic titanium compound representative as the alkyl titanate may be used as the catalyst. In this way, a reaction time may be shortened by increasing an esterification reaction rate.

The operating temperature of the reactor may, for example, be in a range of 130 to 250° C., 160 to 250° C., or 190 to 230° C. In this case, the operating temperature of the reactor may individually refer to an operating temperature of the reactor in each of the first reaction unit to the $n^{th}$ reaction unit. More specifically, the reactor of each of the first reaction unit to the $n^{th}$ reaction unit may be equally or individually controlled in the temperature range.

The operating pressure of the reactor may be in a range of 0 to 5.5 kg/cm$^2$G, 0 to 3 kg/cm$^2$G, or 0 to 2 kg/cm$^2$G. In this case, the operating pressure of the reactor may individually refer to an operating pressure of the reactor in each of the first reaction unit to the $n^{th}$ reaction unit. More specifically, the reactor of each of the first reaction unit to the $n^{th}$ reaction unit may be equally or individually controlled in the pressure range.

According to one embodiment of the present invention, the dicarboxylic acid may be terephthalic acid, and the alcohol maybe 2-ethylhexanol. As such, when terephthalic acid and 2-ethylhexanol are introduced into the reactor in the presence of a catalyst to perform an esterification reaction, dioctyl terephthalate (DOTP) may be manufactured as the diester-based material. The dioctyl terephthalate is a substance that is widely used as a non-toxic environmentally-friendly plasticizer, and thus may exhibit excellent compatibility with polymer materials such as PVC, and the like, and may have excellent characteristics such as low volatility and electrical characteristics.

According to one embodiment of the present invention, the reaction part is composed of a total of n reaction units which are connected in series, and may be designed in consideration of the controlled conversion rate of the reaction, the retention time in each of the reaction units, and the like, and may also be designed in consideration of the composition of a product to be achieved. For example, n may be in a range of 2 to 8, 3 to 7, or 4 to 6. That is, the reaction part may include 2 to 8, 3 to 7, or 4 to 6 reaction units.

According to one embodiment of the present invention, the reaction units 10, 20, 30, 40, and n0 may further include columns 12, 22, 32, 42, and n2 in which an upper discharge stream of a reactor including an alcohol and water vaporized during an esterification reaction is received from the reactors 11, 21, 31, 41, and n1 to perform a gas/liquid separation, through which a gas phase is supplied as an upper discharge stream into layer separators 14, 24, 34, 44, and n4 by passing through condensers 13, 23, 33, 43, and n3 and a liquid phase is supplied as a lower discharge stream into the reactors 11, 21, 31, 41, and n1; and layer separators 14, 24, 34, 44, and n4 configured to separate a water layer and an alcohol layer to reflux only the alcohol into the columns and remove water.

In the reactor, a diester-based compound, which is a reaction product through an esterification reaction of the dicarboxylic acid and the alcohol, and water as a by-product involved in the esterification reaction may be generated. For example, the reaction product of the esterification reaction may include a diester-based compound, water, and unreacted materials.

To increase a forward reaction rate of the esterification reaction, water that is the by-product should be effectively removed to prevent an inverse reaction caused by water and a deactivation of the catalyst. In this regard, as a method of removing water as the by-product, there is a method of vaporizing and drawing off water. When the water is vaporized, the alcohol having a higher boiling point than water is also vaporized due to the high reaction temperature. In this case, the vaporized alcohol may be recovered and refluxed back into the reactor to maintain high concentrations of the reactants in the reactor and remove water.

Specifically, as an esterification reaction occurs at a temperature higher than the boiling point of the alcohol while performing the esterification reaction in the reactor, the alcohol that is vaporized without participating in the reaction may inevitably exist. At the same time, because water is generated as the by-product other than the reaction product (i.e., a diester-based compound), water may be drawn off as an upper discharge stream in the reactor while vaporizing water together with the alcohol. The vaporized water and alcohol may be drawn off as an upper discharge stream of the reactor, and may be supplied into the column.

In the column, the gas-phase alcohol and water introduced from the reactor may be liquefied by the low-temperature liquid-phase alcohol supplied from the layer separator into an upper portion of the column, and most of the gas-phase alcohol may be selectively liquefied and drawn off as a lower discharge stream in the column. In this case, the lower discharge stream of the column including the liquid-phase alcohol may be introduced back into an upper portion of the reactor, and the liquid-phase alcohol may participate in the esterification reaction again.

As such, the forward reaction rate may be enhanced by passing the upper discharge stream of the reactor through the column to prevent water included in the upper discharge stream of the reactor from condensing and being introduced back into the reactor.

Also, the alcohol that has been vaporized from the reactor may be refluxed back into the reactor to maintain an excess ratio of the alcohol with respect to the dicarboxylic acid in the reactor, and water that is the by-product of the esterification reaction may be drawn off from the reaction system and removed to prevent water from being refluxed into the reactor, thereby preventing a decrease in reaction rate in the reactor and a degradation of performance of the catalyst.

In the present invention, the term "excess ratio" may refer to a ratio of an alcohol which is present in an excessive amount based on the mole ratio of the dicarboxylic acid and the alcohol stoichiometrically required in the reactor in order to secure the reactivity.

Meanwhile, the gas-phase water and the non-liquefied gas-phase alcohol in the column may be drawn off as an upper discharge stream of the column, and the upper discharge stream of the column may pass through the condenser and be supplied into the layer separator. Specifically, in the layer separator or before introduction into the layer separator, the gas-phase alcohol and water need to be liquefied. Therefore, any region of a line through which the upper discharge stream of the column is transferred to the layer separator is provided with the condenser, and the gas-phase alcohol and water may be liquefied before introduction into the layer separator by removing heat of the gas-phase alcohol and water through the condenser.

The layer separation in the layer separator may be performed using a difference in densities between the alcohol and water. As a specific example, because the alcohol has a lower density than water, an alcohol layer may be formed in an upper portion of the layer separator, and a water layer may be formed in a lower portion of the layer separator. As such, after the water layer and alcohol layer are separated in the layer separator, only the alcohol may be selectively separated from the alcohol layer through a line connected to an upper portion of the column, and refluxed into the column. Also, water may be removed through a draw-off line through which water is drawn off from the water layer, or may be recycled through various routes.

As the alcohol whose temperature is reduced by condensation in the column is refluxed into the reactor, an internal temperature of the reactor may be reduced. Therefore, the calorie may be separately supplied into the reactor by supplying energy of high-pressure steam or high-temperature steam in order to maintain the internal temperature of reactor. Because the high-pressure steam has an equilibrium temperature (a high temperature) with a high pressure, the calorie may be supplied into the reactor by supplying the high-pressure steam.

The reaction product in the reactor may be separated from the lower discharge stream of the reactor, and the lower discharge stream of each of the reactors of the first reaction unit to the $n-1^{st}$ reaction unit may be supplied into the reactors of the rear reaction units among the respective reaction units. Also, the lower discharge stream in the reactor of the $n^{th}$ reaction unit that is the last reaction unit may be separated, refined, and manufactured into products. Specifically, the lower discharge stream of each of the first reactor, which is the reactor of the first reaction unit, to the $n-1^{st}$ reactor, which is the reactor of the $n-1^{st}$ reaction unit, may be supplied into the reactor of each of the rear reaction units among the respective reaction units, and the lower discharge stream in the $n^{th}$ reactor that is the reactor of the last reaction unit (an $n^{th}$ reaction unit) may be separated, refined, and manufactured into products.

For example, when a reaction part in which 4 reaction units are connected in series is included to manufacture the diester-based compound, the lower discharge stream of the first reactor 11 that is the reactor of the first reaction unit 10 may be supplied into a second reactor 21 that is a reactor of a second reaction unit 20, the lower discharge stream of the second reactor 21 may be supplied into a third reactor 31 that is the reactor of a third reaction unit 30, the lower discharge stream of the third reactor 31 may be supplied into a fourth reactor 41 that is a reactor of a fourth reaction unit 40, and the lower discharge stream of the fourth reactor 41 that is the reactor of the fourth reaction unit 40 may be separated, refined, and manufactured into products.

According to one embodiment of the present invention, lower portions of the reactors may be provided with lower draw-off lines 11a, 21a, 31a, 41a, and n1a, respectively, in order to transfer the lower discharge stream of each of the reactors of the reaction units 10, 20, 30, 40, and n0 into the reactors of the rear reaction units or transfer the lower discharge stream for subsequent separation and refinement processes. In addition, the lower draw-off lines may be provided with pumps 15, 25, 35, 45, and n5, respectively.

The diester-based compound included in the lower discharge stream of the $n^{th}$ reactor that is the reactor of the last reaction unit may be refined using a method known in the art. For example, when an esterification reaction is performed using an organic titanium compound as the catalyst, water is added to the obtained diester-based compound to deactivate the catalyst, and the remaining unreacted alcohol may be removed by evaporation by distilling the lower discharge stream with water vapor. Also, the remaining dicarboxylic acid may be neutralized by treatment with an alkaline material. Also, the solids may be removed by filtration to obtain a high-purity diester-based compound.

According to one embodiment of the present invention, the method of manufacturing a diester-based compound may include: supplying a feed stream including a dicarboxylic acid and an alcohol into the first reactor 11; esterifying the feed stream to manufacture a reaction product; and supplying a lower discharge stream including the reaction product into reactors of the rear reaction units. In this case, a conversion rate of the esterification reaction in the first reactor 11 may be controlled in a range of 50 to 80%.

The lower discharge stream of the first reactor 11 may be in a slurry state including a solid-phase unreacted dicarboxylic acid, a liquid-phase unreacted alcohol, and a liquid-phase diester-based compound. As such, when a content of the unreacted dicarboxylic acid in the lower discharge stream of the first reactor 11 is high, the unreacted dicarboxylic acid may be accumulated in the pipes and pumps through which the lower discharge stream of the first reactor is transferred, and problems regarding the transfer of the reaction product into the rear reactors may be caused due to the decreased flowability caused by the accumulated unreacted dicarboxylic acid. Also, there is a problem such as easy clogging of pipes, pumps, and the like with an increasing retention time in the pipes (transfer lines). When the pipes and pumps are clogged, an operation is shut down, and the pipes and pumps need to be washed. In this case, it takes a long time to wash the pipes and pumps, and a time at which the operation is shut down may increase when it is difficult to use provisional pumps and pipes, resulting in economic losses and an increased unit cost for manufactured products.

Accordingly, according to the present invention, a conversion rate of the esterification reaction in the first reactor 11 may be controlled in a range of 50 to 80% so as to increase a linear velocity of a lower discharge stream of the first reactor 11 to a limit velocity or higher at which the reaction product in a slurry state may be accumulated in the pipes and pumps, thereby improving the flowability. Also, the clogging of pipes, pumps, and the like of lower draw-off lines in the first reactor 11 may be prevented to extend a maintenance/repair duration in the pipes and pumps.

In this case, the limit velocity refers to a velocity at which solids components in a fluid start to be accumulated, and thus may be empirically determined based on the limit velocity of slurry. Specifically, the limit velocity may be calculated using the Durand equation, and may be calculated with reference to the Rheology-based empirical equation. In this case, the limit velocity may be calculated using factors such as the average particle size and density of the solid components, a volume fraction, a temperature of a fluid, and the like.

According to one embodiment of the present invention, as shown in FIG. 1, the controlling of the conversion rate to be in a range of 50 to 80% is performed by increasing a volume of the first reactor 11 as compared to that of the subsequent n−1 reactors 21, 31, 41, and n1 in a state in which a flow rate of the feed stream supplied into the first reactor 11 is maintained constant. As such, when the volume of the first reactor 11 increases in which the flow rate of the feed stream supplied into the first reactor 11 is maintained constant, a retention time of the feed stream supplied into the first reactor 11 may increase as compared to before an increase in volume of the first reactor 11, thereby improving the conversion rate for reactions of the reactants in the feed stream in the first reactor 11.

An increase in volume of the first reactor 11 to control the conversion rate in the first reactor 11 may be adjusted according to the reaction conditions such as the operating temperature and pressure of the first reactor 11, and the like. As one non-limiting example, the volume of the first reactor 11 may be in a range of 110 to 500%, 130 to 450%, or 160 to 400% with respect to the volume of each of the subsequent n−1 reactors. As a specific example, the volume range of the first reactor 11 may be applied when the operating temperature of the first reactor 11 is in a range of 130 to 250° C., 160 to 250° C., or 190 to 230° C., and the operating pressure of the first reactor 11 is in a range of 0 to 5.5 kg/cm²G, 0 to 3 kg/cm²G, or 0 to 2 kg/cm²G, but the present invention is not limited thereto.

As a more specific example, when the volume range of the first reactor 11 is greater than or equal to 110% at the conditions of the operating temperature and the operating pressure, it is easy to control the conversion rate of the first reactor 11 by 50% or more, which may result in an excellent effect of improving the flowability of the lower discharge stream in the first reactor 11. On the other hand, when the volume range of the first reactor 11 is less than or equal to 500%, it is easy to control the conversion rate of the first reactor 11 by 80% or less, thereby preventing an inefficient increase in operation and energy costs because an amount of steam used in the first reactor 11 increases to an excessive amount.

According to one embodiment of the present invention, as shown in FIG. 3, the controlling of the conversion rate to be in a range of 50 to 80% may be performed by operating the first reactor 11 in a state in which the first reactor 11 is connected in parallel with the m reactors, and dividedly supplying 1/m of the feed stream into the respective m reactors in a state in which the flow rate of the feed stream supplied into the first reactor is maintained constant. In this case, the connection of the first reactor 11 in parallel with the m reactors means that the first reaction unit 10 is connected in parallel with the m reaction units.

As described above, when the first reactor 11 may be connected in parallel with the m reaction units to supply 1/m of the feed stream into the m reactors in a state in which the flow rate of the feed stream supplied into the first reactor 11 is maintained constant, an increase in retention time of the feed stream supplied into the each of the m reactors may be caused as compared to before the first reactor 11 is connected in parallel with the m reaction units to perform an operation, thereby improving the conversion rate for reactions of the reactants in the feed stream in each of the m reactors.

The parallel number of the first reactor 11 to control the conversion rate in the first reactor 11 may be adjusted according to the reaction conditions such as the operating temperature and pressure of the first reactor 11, and the like. As one non-limiting example, m maybe in a range of 2 to 8, 2 to 5, or 2 to 3. When the first reactor 11 in the first reaction unit 10 is connected in parallel in the above range to perform an operation, there is an effect of facilitating the controlling of the conversion rate in the first reactor 11. As a specific example, a range of m, which is the parallel number of the first reactor 11, may be applied when the operating temperature of the first reactor 11 is in a range of 130 to 250° C., 160 to 250° C., or 190 to 230° C., and the operating pressure of the first reactor 11 is in a range of 0 to 5.5 kg/cm²G, 0 to 3 kg/cm²G, or 0 to 2 kg/cm²G, but the present invention is not limited thereto.

As a more specific example, when m is greater than or equal to 2 at the conditions of the operating temperature and the operating pressure, it is easy to control the conversion rate of the first reactor 11 by 50% or more, which may result in an excellent effect of improving the flowability of the lower discharge stream in the first reactor 11. On the other hand, when m is less than or equal to 8, it is easy to control the conversion rate of the first reactor 11 by 80% or less, thereby preventing an inefficient increase in operation and energy costs because an amount of steam used in the first reactor 11 increases to an excessive amount.

According to one embodiment of the present invention, a content of the dicarboxylic acid in the lower discharge stream of the first reactor 11 may be less than or equal to 8.5% by volume, or in range of 0.1 to 8.5% by volume, or 3.0 to 8.1% by volume. Specifically, the conversion rate of the esterification reaction in the first reactor 11 may be controlled in a range of 50 to 80% to reduce the content of the dicarboxylic acid in the lower discharge stream of the first reactor 11 to the above content range.

Meanwhile, for example, when the conversion rate of the esterification reaction in the first reactor 11 is shown to be less than 50%, the content of the unreacted dicarboxylic acid in the lower discharge stream of the first reactor 11 including the reaction product may become higher, compared to the reactors of the rear reaction units. Therefore, the content of the dicarboxylic acid in the lower discharge stream of the first reactor 11 may vary according to the conversion rate, but may be, for example, greater than 10% by volume.

As such, when the conversion rate of the first reactor 11 may be controlled in a range of 50 to 80% to reduce the content of the unreacted dicarboxylic acid in the lower discharge stream of first reactor 11 to the above content range, the flowability into the reactors of the rear reaction units may be improved, and the clogging of pipes and pumps may be prevented to extend a maintenance/repair duration of the pipes and pumps.

According to one embodiment of the present invention, in the method of manufacturing a diester-based compound, devices such as a distillation column, a condenser, a reboiler, a valve, a pump, a separator, a mixer, and the like may be further installed, when necessary.

As described above, the method of manufacturing a diester-based compound according to the present invention has been described and shown with reference to the drawings. However, the above description and the illustration of the drawings are presented to describe and illustrate only the core configuration to understand the present invention. Thus, in addition to the processes and devices described and illustrated herein, processes and devices which are not described or illustrated in any separate manners may be properly applied and used to put practice into the method of manufacturing a diester-based compound according to the present invention.

Hereinafter, the present invention will be described in further detail with reference to embodiments thereof. However, it will be apparent to those skilled in the art that the following embodiments are given for the purpose of illustrating the present invention, and may be variously modified and changed without departing from the technical spirit and scope of the present invention, but are not indeed to limit the scope of the present invention.

EXAMPLES

Examples 1-1 to 1-3

Dioctyl terephthalate (DOTP) was manufactured according to the process flow chart as shown in FIG. 2.

Specifically, a feed stream including terephthalic acid (TPA) and 2-ethylhexanol (2-EH) at a mole ratio of 1:2 to 4.5 was supplied onto a first reactor 11 that was a reactor of a first reaction unit 10, and reacted in the presence of a catalyst to reflux an alcohol into the reactor 11 and remove water from an upper discharge stream vaporized in the first reactor 11 using a column 12, a condenser 13, and a layer separator 14. Also, a reaction product drawn off through a lower draw-off line 11a in the first reactor 11 was passed through a pump 15 and supplied into a second reactor 21 that is a reactor of a second reaction unit 20.

As in the operation flow in the first reaction unit 10, a continuous stirred tank reactor (CSTR) was operated through a second reaction unit 20, a third reaction unit 30, and a fourth reaction unit 40, and a lower discharge stream of a fourth reactor 41 that was a reactor of the last fourth reaction unit 40 was separated and refined to obtain dioctyl terephthalate.

In this case, all of the first reactor 11 to the fourth reactor 41 were connected in series, and the first reactor 11 was operated at an operating temperature of 195° C. and an operating pressure of 0.5 kg/cm²G. In the case, a retention time in the first reactor 11 was adjusted so that the conversion rate in the first reactor 11 was in a range of 50 to 60%, and the adjustment of the retention time was performed by increasing a volume of the first reactor 11 as compared to the 3 subsequent reactors.

Also, the simulation results measured using a commercially available process simulation program ASPEN PLUS (AspenTec) are listed in Table 1 below.

Examples 2-1 to 2-3

These examples were performed in the same manner as in Example 1, except that the first reactor 11 was operated at an operating temperature of 200° C. instead of 195° C., the retention time in the first reactor 11 used in Example 1 was adjusted so that the conversion rate in the first reactor 11 was in a range of 50 to 60%, and the adjustment of the retention time was performed by increasing a volume of the first reactor 11 as compared to the 3 subsequent reactors.

Also, the simulation results measured using a commercially available process simulation program ASPEN PLUS (AspenTec) are listed in Table 2 below.

Examples 3-1 to 3-3

Dioctyl terephthalate (DOTP) was manufactured according to the process flow chart as shown in FIG. 3.

Specifically, a feed stream including terephthalic acid (TPA) and 2-ethylhexanol (2-EH) at a mole ratio of 1:2 to 4.5 was supplied onto a first reactor 11 that was a reactor of a first reaction unit 10, and reacted in the presence of a catalyst to reflux an alcohol into the reactor 11 and remove water from an upper discharge stream vaporized in the first reactor 11 using a column 12, a condenser 13, and a layer separator 14. Also, a reaction product drawn off through a lower draw-off line 11a in the first reactor 11 was passed through a pump 15 and supplied into a second reactor 21 that is a reactor of a second reaction unit 20.

As in the operation flow in the first reaction unit 10, a continuous stirred tank reactor (CSTR) was operated through a second reaction unit 20, a third reaction unit 30, and a fourth reaction unit 40, and a lower discharge stream of a fourth reactor 41 that was a reactor of the last fourth reaction unit 40 was separated and refined to obtain dioctyl terephthalate.

In this case, the first reactor 11 was operated at an operating temperature of 195° C. and an operating pressure of 0.5 kg/cm²G. In the case, a retention time in the first reactor 11 was adjusted so that the conversion rate in the first reactor 11 was in a range of 50 to 60%, and the adjustment of the retention time was performed by connecting the first reaction unit in parallel with two reaction units to operate the first reaction unit.

Specifically, the first reaction unit was connected in parallel with the two reaction units and, operated, wherein the volumes of the first reactor 11 and the second reactor 21 were set to be the same extents. In this case, the feed stream supplied into the first reactor 11 was supplied at the same flow rate as in Example 1, wherein the feed stream was divided into halves, and supplied into the two first reactors 11 connected in parallel.

Also, the simulation results measured using a commercially available process simulation program ASPEN PLUS (AspenTec) are listed in Table 3 below.

Examples 4-1 to 4-6

These examples were performed in the same manner as in Example 1, except that the first reactor 11 was operated at an operating temperature of 215° C. instead of 195° C., the retention time in the first reactor 11 used in Example 1 was adjusted so that the conversion rate in the first reactor 11 was in a range of 50 to 80%, and the adjustment of the retention time was performed by increasing a volume of the first reactor 11 as compared to the 3 subsequent reactors.

Also, the simulation results measured using a commercially available process simulation program ASPEN PLUS (AspenTec) are listed in Table 4 below.

Comparative Examples 1-1 to 1-3

These examples were performed in the same manner as in Example 1, except that the retention time in the first reactor 11 used in Example 1 was adjusted so that the conversion rate in the first reactor 11 was in a range of 33 to 45%, and the adjustment of the retention time was performed by increasing a volume of the first reactor 11 as compared to the 3 subsequent reactors.

Also, the simulation results measured using a commercially available process simulation program ASPEN PLUS (AspenTec) are listed in Table 1 below.

Comparative Examples 2-1 to 2-3

These examples were performed in the same manner as in Example 2, except that the retention time in the first reactor 11 used in Example 2 was adjusted so that the conversion rate in the first reactor 11 was in a range of 38.5 to 45%, and the adjustment of the retention time was performed by increasing a volume of the first reactor 11 as compared to the 3 subsequent reactors.

Also, the simulation results measured using a commercially available process simulation program ASPEN PLUS (AspenTec) are listed in Table 2 below.

Comparative Examples 3-1 to 3-3

These examples were performed in the same manner as in Example 3, except that the retention time in the first reactor 11 used in Example 3 was adjusted so that the conversion rate in the first reactor 11 was in a range of 33 to 45%, and the adjustment of the retention time was performed by connecting the first reaction unit in parallel with two reaction units to operate the first reaction unit.

Also, the simulation results measured using a commercially available process simulation program ASPEN PLUS (AspenTec) are listed in Table 3 below.

TABLE 1

|  | Comparative Examples | | | Examples | | |
| --- | --- | --- | --- | --- | --- | --- |
|  | 1-1 | 1-2 | 1-3 | 1-1 | 1-2 | 1-3 |
| Retention time of first reactor (hr/hr) | 1.00 | 1.30 | 1.70 | 2.00 | 3.00 | 4.00 |
| Conversion rate (%) | 33.0 | 40.0 | 45.0 | 50.0 | 55.0 | 60.0 |
| TPA content (% by volume) | 10.9 | 9.7 | 8.9 | 8.1 | 7.3 | 6.5 |
| limit velocity (m/s) | 0.98 | 0.98 | 0.97 | 0.96 | 0.96 | 0.96 |
| Linear velocity (m/s) | 0.97 | 0.97 | 0.97 | 0.97 | 0.97 | 0.97 |
| Solid accumulation | ○ | ○ | ○ | x | x | x |
| Use amount of first reactor steam (%) | 70.0 | 74.2 | 78.4 | 80.8 | 86.5 | 89.9 |

TABLE 2

|  | Comparative Examples | | | Examples | | |
| --- | --- | --- | --- | --- | --- | --- |
|  | 2-1 | 2-2 | 2-3 | 2-1 | 2-2 | 2-3 |
| Retention time of first reactor (hr/hr) | 1.00 | 1.10 | 1.40 | 1.60 | 2.00 | 2.50 |
| Conversion rate (%) | 38.5 | 40.0 | 45.0 | 50.0 | 55.0 | 60.0 |
| TPA content (% by volume) | 9.9 | 9.7 | 8.9 | 8.1 | 7.3 | 6.4 |
| Limit velocity (m/s) | 0.99 | 0.98 | 0.97 | 0.96 | 0.96 | 0.96 |
| Linear velocity (m/s) | 0.97 | 0.97 | 0.97 | 0.97 | 0.97 | 0.97 |
| Solid accumulation | ○ | ○ | ○ | x | x | x |
| Use amount of first reactor steam (%) | 91.0 | 93.2 | 97.7 | 100.0 | 100.0 | 103.1 |

TABLE 3

|  | Comparative Examples | | | Examples | | |
| --- | --- | --- | --- | --- | --- | --- |
|  | 3-1 | 3-2 | 3-3 | 3-1 | 3-2 | 3-3 |
| Retention time of first reactor (hr/hr) | 1.00 | 1.30 | 1.70 | 2.00 | 3.00 | 4.00 |
| Conversion rate (%) | 33.0 | 40.0 | 45.0 | 50.0 | 55.0 | 60.0 |
| TPA content (% by volume) | 10.9 | 9.7 | 8.9 | 8.1 | 7.3 | 6.5 |
| Limit velocity (m/s) | 0.98 | 0.98 | 0.97 | 0.96 | 0.96 | 0.96 |
| Linear velocity (m/s) | 0.97 | 0.97 | 0.97 | 0.97 | 0.97 | 0.97 |
| Solid accumulation | ○ | ○ | ○ | x | x | x |
| Use amount of first reactor steam (%) | 70.0 | 74.2 | 78.4 | 80.8 | 86.5 | 89.9 |

TABLE 4

|  | Examples | | | | | |
| --- | --- | --- | --- | --- | --- | --- |
|  | 4-1 | 4-2 | 4-3 | 4-4 | 4-5 | 4-6 |
| Retention time of first reactor (hr/hr) | 0.70 | 0.90 | 1.20 | 1.50 | 1.90 | 3.00 |
| Conversion rate (%) | 50.0 | 55.0 | 60.0 | 65.0 | 70.0 | 80.0 |
| TPA content (% by volume) | 7.9 | 7.1 | 6.3 | 5.6 | 4.3 | 3.1 |
| Limit velocity (m/s) | 0.96 | 0.96 | 0.96 | 0.95 | 0.94 | 0.93 |
| Linear velocity (m/s) | 0.97 | 0.97 | 0.97 | 0.97 | 0.97 | 0.97 |
| Solid accumulation | x | x | x | x | x | x |
| Use amount of first reactor steam (%) | 1094.0 | 881.0 | 656.4 | 523.3 | 445.3 | 364.2 |

In Tables 1 to 4, the retention time (hr/hr) of the first reactor refers to a ratio of the retention time of the first reactor 11 of the first reaction unit 10 to the retention time of the rear reactor (a second, third, or fourth reactor).

Also, the conversion rate (%) refers to a conversion rate obtained in the first reactor 11 of the first reaction unit 10.

In addition, the TPA content refers to a volume fraction of a terephthalic acid in a lower discharge stream of the first reactor 11 of the first reaction unit 10.

Also, the limit velocity refers to a velocity at which the terephthalic acid in the lower discharge stream of the first reactor 11 of the first reaction unit 10 starts to be accumulated, and is calculated using the Durand equation by setting an average particle size and a density of the terephthalic acid to 100 μm and 1,520 kg/m³ as the variables, respectively, and applying the operating temperature and TPA content of the first reactor 11 of the first reaction unit 10 to the variables.

In addition, the linear velocity refers to an actual linear velocity of the lower discharge stream in the first reactor 11 of the first reaction unit 10.

Furthermore, the solid accumulation means whether the lower discharge stream of the first reactor is drawn off and terephthalic acid is accumulated in pipes and pumps through which the lower discharge stream is transferred to a rear reactor (a second reactor). In this case, when the linear velocity is compared with the limit velocity, the case in which the linear velocity is lower than the limit velocity is represented by "0", and the case in which the linear velocity is higher than the limit velocity is represented by "x."

Also, a use amount of the steam is represented by a relative amount with respect to the use amount of the steam measured in Comparative Example 2-3.

In addition, the maximum volume of each of the reactors was set to 100 m³, and the first reactors were connected in parallel, and operated when the volume of the first reactor was greater than the maximum volume. Specifically, when it was assumed that the retention time (hr/hr) of the first reactor is 2.00, for example, the volume of the first reactor was set to 80 m³ when the volumes of the rear reactors (second, third, and fourth reactors) were 40 m³, and when the volumes of the rear reactors (second, third, and fourth reactors) were 80 m³, the volume of the first reactor was 160 m³. Accordingly, two reactors having a volume of 80 m³ were connected in parallel to perform a simulation.

Further, the retention time (hr/hr) of the first reactor, the conversion rate, the TPA content, the limit velocity, the linear velocity, the solid accumulation, and the use amount of the first reactor steam as listed in Table 3 in which the first reactors are connected in parallel are represented by average values of the results for each of the two reactors connected in parallel.

Tables 1, 2, and 4 list the ratios of the retention time of the first reactor with respect to the rear reactors (second, third, and fourth reactors) according to an increase in volume of the first reactor with respect to the rear reactors (second, third, and fourth reactors), the conversion rate in the first reactor according to the increase in volume of the first reactor, when the operating temperature conditions of the first reactor were 195° C., 200° C., and 215° C., respectively, and the accumulation of solids (terephthalic acid) in the pipes and pumps according to the conversion rate.

Referring to Tables 1, 2, and 4, the conversion rate of the first reactor was shown to be less than 50% in Comparative Examples 1-1 and 2-1 in which the volume of the first reactor was maintained at the same volumes as the rear reactors (second, third, and fourth reactors). As a result, it can be seen that the linear velocity of the lower discharge stream in the first reactor 11 was shown to be less than or equal to the limit velocity, and thus the terephthalic acid was accumulated in the pipes and pumps.

Also, it can be seen that the linear velocity of the lower discharge stream in the first reactor 11 was also shown to be less than or equal to the limit velocity, and thus the terephthalic acid was accumulated in the pipes and pumps in Comparative Examples 1-2, 1-3, 2-2, and 2-3 in which the volume of the first reactor was increased with respect to those of the rear reactors (second, third, and fourth reactors) but the conversion rate was less than 50%.

Meanwhile, in Examples 1-1 to 1-3, Examples 2-1 to 2-3, and Examples 4-1 to 4-6 in which the conversion rate of the first reactor was controlled in a range of 50 to 80%, the content of the terephthalic acid in the lower discharge stream of the first reactor was reduced as compared to those of Comparative Examples. As a result, it can be seen that the accumulation of the terephthalic acid in the pipes and pumps was prevented when the linear velocity of the lower discharge stream in the first reactor 11 increased to a velocity greater than the limit velocity.

In particular, it can be seen that, in Examples 4-3 to 4-6 in which the conversion rate was controlled in a range of 50 to 80% by increasing the volume of the first reactor as compared to those of the rear reactors (second, third, and fourth reactors), the use amount of steam in the first reactor was remarkably reduced as compared to Examples 4-1 to 4-2 in which the conversion rate was controlled in a range of 50 to 80% in a state in which the volume of the first reactor was reduced compared to those of the rear reactors (second, third, and fourth reactors).

Accordingly, it was confirmed according to the present invention that, when the conversion rate of the first reactor was controlled in a range of 50 to 80%, the linear velocity of the lower discharge stream in the first reactor 11 increased to a velocity greater than the limit velocity at which the product in a slurry state was able to be accumulated in the pipes and pumps, thereby improving the flowability. Also, it was confirmed that the clogging of pipes, pumps, and the like of lower draw-off lines in the first reactor 11 was prevented to extend a maintenance/repair duration in the pipes and pumps.

The invention claimed is:

1. A method of manufacturing a diester-based compound in a continuous process using a reaction part in which a total of n reaction panning from a first reaction unit to an $n^{th}$ reaction unit are connected in series,
    wherein each of the reaction units comprises a reactor such that the reaction part includes a first reactor to a $n^{th}$ reactor, and
    the method comprises:
    supplying a feed stream comprising a dicarboxylic acid and an alcohol into the first reactor;
    esterifying the feed stream to prepare a reaction product; and
    supplying a lower discharge stream comprising the reaction product into the reactor of at least one rear reaction unit,
    wherein a conversion rate of the esterification reaction in the first reaction unit is controlled in a range of 50 to 80%,
    wherein the first reaction unit comprises m reactors including the first reactor in a state that the first reactor and the m reactors are connected in parallel, and the feed stream of the first reactor is divided by m, which is fed into each of the first reactor and the m reactors, and a flow rate of the feed stream supplied into the first reaction unit is maintained constant to control the conversion rate to be in the range of 50 to 80%.

2. The method of claim 1, wherein an operating temperature of the first reactor is in a range of 130 to 250° C.

3. The method of claim 1, wherein m is in a range of 2 to 3.

4. The method of claim 1, wherein the lower discharge stream comprising the reaction product is in a slurry state.

5. The method of claim 1, wherein a mole ratio of the dicarboxylic acid and the alcohol in the feed stream is in a range of 1:2 to 1:10.

6. The method of claim 1, wherein a content of the dicarboxylic acid in a lower discharge stream of the first reactor is less than or equal to 8.5% by volume.

7. The method of claim 1, wherein the method further comprises performing a gas/liquid separation during the esterifying, and
- at least one of the n reaction units further comprises a column, a condenser, and a layer separator, and
- the gas/liquid separation process comprises:
- feeding an upper discharge stream of the reactor of the at least one of the n reaction units, comprising an alcohol and water, to the column;
- discharging a gaseous phase from the column as an upper discharge stream and supplying the upper discharge stream to the condenser;
- discharging a liquid phase from the column as a lower discharge stream which is returned to the reactor;
- condensing the upper discharge stream from the column in the condenser to form a condensed upper discharge stream which is fed to the layer separator;
- separating a water layer from an alcohol layer in the layer separator;
- refluxing the alcohol layer back to the column; and
- discharging water from the reaction unit.

8. The method of claim 1, wherein n is in a range of 2 to 8.

9. The method of claim 1, wherein the dicarboxylic acid comprises terephthalic acid, and the alcohol comprises 2-ethylhexanol.

10. The method of claim 1, wherein the conversion rate of the esterification reaction in the first reactor is controlled in a range of 50 to 60%.

* * * * *